United States Patent [19]
McMurtry

[11] Patent Number: 5,402,981
[45] Date of Patent: Apr. 4, 1995

[54] WORKPIECE MEASURING MACHINE

[75] Inventor: David R. McMurtry, Wotton-Under-Edge, United Kingdom

[73] Assignee: Renishaw Metrology Limited, Gloucestershire, United Kingdom

[21] Appl. No.: 37,424

[22] Filed: Mar. 26, 1993

[30] Foreign Application Priority Data

Apr. 2, 1992 [GB] United Kingdom ............... 9207259

[51] Int. Cl.6 ..................... F16M 1/00; G01B 5/03
[52] U.S. Cl. .................................. 248/638; 33/503
[58] Field of Search ............... 33/503, 1 M; 248/638, 248/676

[56] References Cited

U.S. PATENT DOCUMENTS 4,908,950 3/1990 Band et al. ........................ 33/503
5,119,566 6/1992 Schalz et al. ..................... 33/503

FOREIGN PATENT DOCUMENTS 0255574 2/1988 European Pat. Off. .
WO89/03505 4/1989 WIPO .

*Primary Examiner*—Blair M. Johnson
*Attorney, Agent, or Firm*—Oliff & Berridge

[57] ABSTRACT

A measuring machine includes a table, a base and a metrology frame that supports carriages for moving a probe around the working volume of the machine. The metrology frame is fabricated into a lightweight but torsionally rigid structure. The base that supports the metrology frame on the table is rigidly connected to the metrology frame but is kinematically located on the table by supports. The table and the base can also be made as relatively lightweight structures but distortions of the table due to heavy workpieces are not transmitted to the metrology frame. The construction of the machine also enables it to be easily dismantled and packed for transportation.

9 Claims, 2 Drawing Sheets

WORKPIECE MEASURING MACHINE

BACKGROUND OF THE INVENTION

The present invention relates to a workpiece measuring machine and has particular reference to a machine adapted for scanning the surface of a workpiece to determine the shape thereof.

A variety of forms of measuring machine are currently in use each of which is more or less suited to carry out measurements on workpieces as diverse as small engineering piece parts, and large scale parts such as car bodies or aircraft wings. These have conveniently been classified into ten categories in a report commencing on page 11 of the ASME standard reference ASME B89.1.12M-1990, the categories including the well-known bridge machines, gantry machines, or cantilever machines. The machines may have either fixed or moving tables on which the workpiece is carried.

The philosophy behind the design of the machines has always been that the table used for supporting the workpiece has to be relatively massive, (traditionally a large granite slab) in order to avoid distortions occurring when heavy workpieces are mounted on the table. This has been particularly so in the moving bridge machines in which the tracks on which the bridge moves are formed on the table. Thus the table also has to be rigid enough to avoid distortions due to the movements of the bridge, which itself is a relatively massive structure in order to support the other moving parts of the machine.

In the fixed bridge and gantry types of machines, movements of the largest masses are avoided, but the fixed supports still are of relatively massive construction to avoid distortions. This leads to a lack of flexibility in the design, in that, in order for the designer to provide a range of machine sizes, a range of bridge and gantry structures have to be designed.

A similar problem is present for the designer of the cantilever machines, in which, a vertical support structure, or base, is required to provide a support at one side of the machine and on which the movable carriages are mounted. The height of the support determines the height of the working volume of the machine, so that to provide a range of working volumes, a range of machines is needed each with a different size of vertical support structure. Since the vertical support structure has to provide a rigid support for the moving carriages, once again the design philosophy has been to make it as a relatively massive rigid block.

Thus prior art machines have traditionally been heavy and. expensive, because of the relatively massive structures provided to give the required rigidity of construction.

SUMMARY OF THE INVENTION

In the present invention a different design philosophy is used. A relatively lightweight metrology frame is provided which supports a measuring probe for movement relative to a relatively lightweight table. It is accepted that the lightweight table may distort and the metrology frame is supported on the table by supports which are configured to prevent transmission of the distortions of the table to the metrology frame.

According to the present invention a measuring machine comprises:
a table for supporting workpieces,
a metrology frame for supporting a measuring device for movement relative to the table, and
a base disposed between the table and the metrology frame for supporting the frame on the table in a spaced-apart relationship therewith,
wherein the base is rigidly connected to one of the table and the metrology frame and has at three locations thereon first support means, second support means being provided on the other one of the table and the metrology frame and which are engageable with the first support means, the configuration of the first and second support means being such that distortions of the table are not transmitted to the metrology frame.

In one form of the invention the support means comprise kinematic supports.

By preventing the transmission of the distorting forces from the table to the metrology frame, the metrology frame can be made from a lightweight structure. In a preferred embodiment of the invention the metrology frame is fabricated from sheet metal into a box structure which need only have sufficient structural rigidity to support the carriages for moving the measuring probe relative to the table.

The base may also be fabricated from lightweight materials its structural stiffness being maintained by the rigid connection to one or other of the table and the metrology frame.

The table needs to have rigidity which is sufficient to minimise distortions, but does not have to be so massive as to eliminate them altogether. Thus the need for a massive granite table has been eliminated.

A machine built in accordance with the present invention can be easily assembled and disassembled for transportation. It also allows the height of the working volume to be changed in a simple inexpensive way by substituting another low cost sheet metal base of different height which engages the same support means and uses the same rigid connections on the table and the metrology frame.

The elevated guideways of the metrology frame allow for the moving mass to be minimized, which is of particular benefit when the machine is to be used for scanning workpiece surfaces, since the lighter weight can be moved at higher accelerations enabling more measurements per second to be taken.

These and other advantages and novel features of the construction of the machine will now be described in more detail, by way of example only, with reference to the accompanying drawings in which:

DETAILED DESCRIPTION OF PREFERRED EMBODIMENTS

Figure 1:
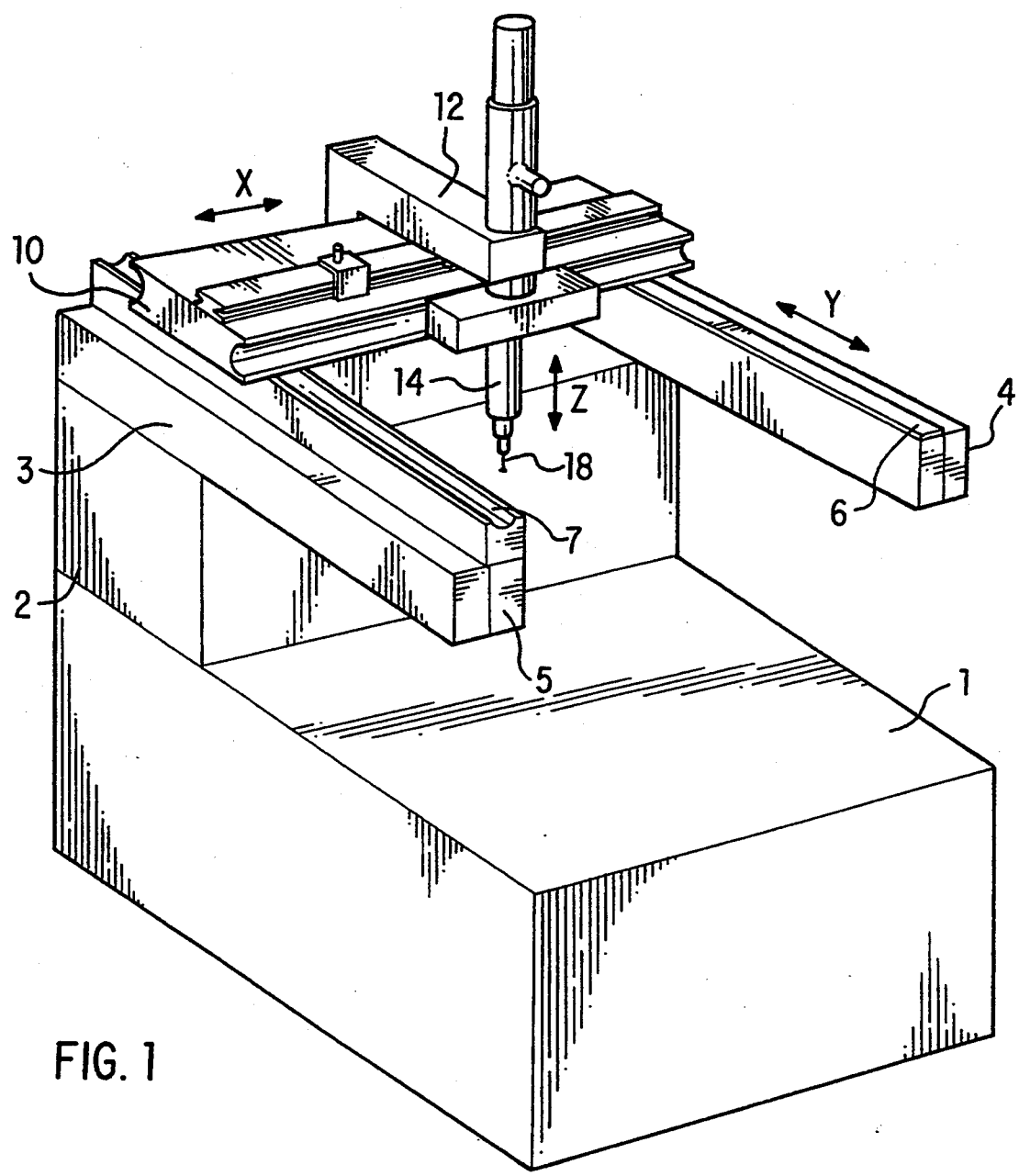
FIG. 1 IS a pictorial view of one embodiment of a measuring Machine of the present invention.

Referring now to the drawings, FIG. 1 shows the general layout of a workpiece measuring machine of the kind designed to scan a surface of a workpiece to determine the profile thereof.

The machine comprises a table 1, a base 2 upstanding from one end of the table, and which is elongate in a direction defined as the X co-ordinate direction of the machine. Mounted on top of the base 2 is a metrology frame 3 which is formed as a relatively rigid box structure, and has at opposite ends thereof a pair of beams 4 and 5. The two beams extend in a direction orthogonal to the X direction, defined as the Y co-ordinate direction, to overlie the table at the side edges thereof. The dimensions of the metrology frame 3 determine the limits in the X and Y directions of the working volume of the machine.

The metrology frame is so-called because it carries tracks 6 and 7, one on each of the beams, which support a moving bridge 10 for movement in the Y direction. The bridge is supported on the tracks by means of air bearings (not shown).

The bridge in turn supports a carriage 12 by means of further air bearings (not shown) for movement in the X direction, and the carriage supports a vertically movable spindle 14. The vertical travel of the spindle, i.e. travel in the Z co-ordinate direction sets the limits of the height of the working volume of the machine. Thus it can be seen that a probe 18 mounted on the lower end of the spindle can be moved around in the working volume of the machine for obtaining the required data from a workpiece positioned on the table.

Details of the motors for moving the various moving parts and the air bearings on which they move are not shown since they do not form part of the present invention.

Figure 2:
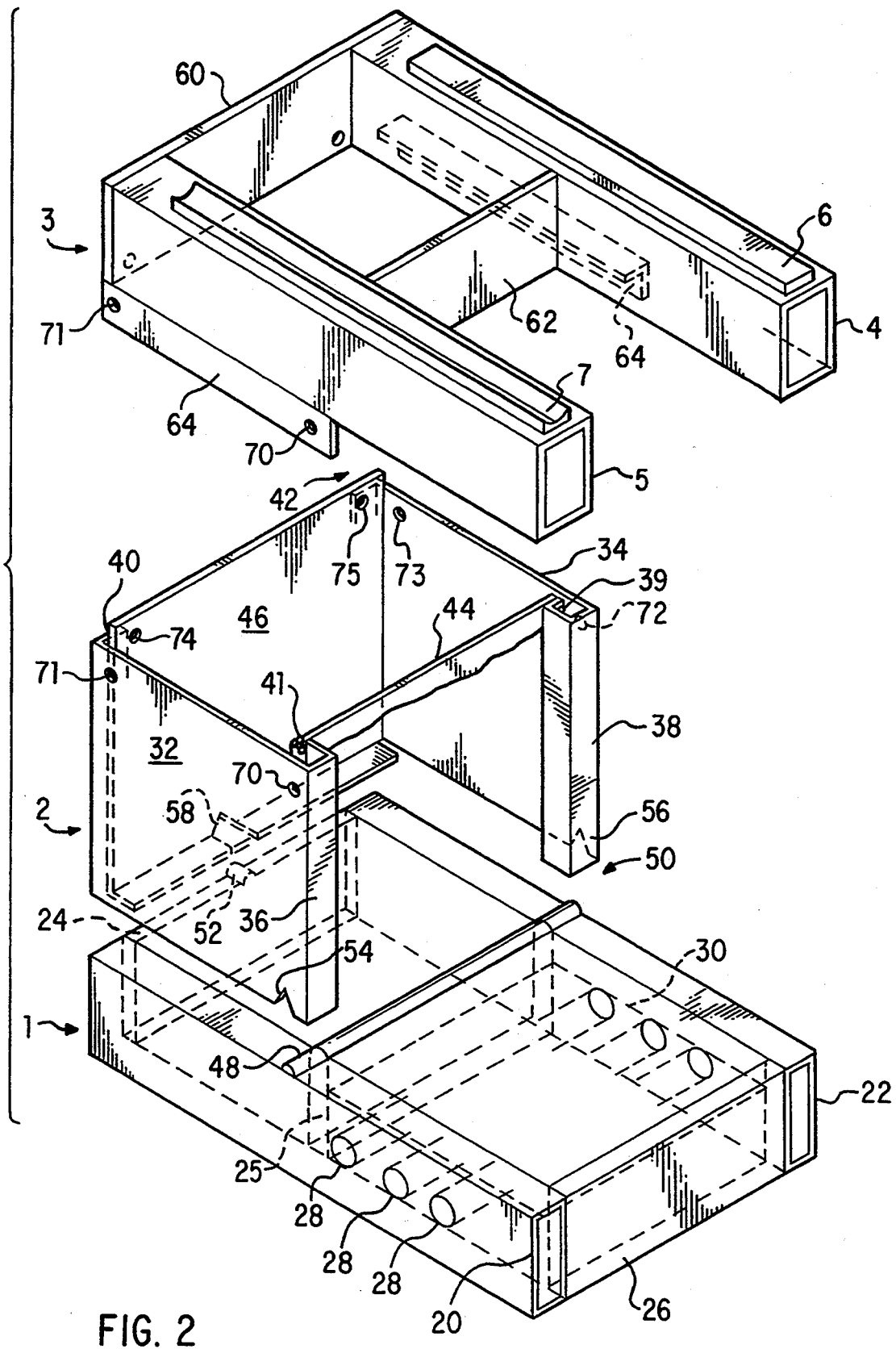
FIG. 2 is an exploded view of the static lower structure of the machine of FIG. 1.

The present invention concerns the construction and assembly of the table 1, the base 2, and the metrology frame 3 which are shown in more detail in FIG. 2.

The table 1 is formed as a relatively rigid box structure in any convenient manner. In FIG. 2 it is shown having two side beams 20,22 and cross beams 24,25 and 26 all of which are hollow Aluminium extrusions. The rear part of the table includes Aluminium sheets top and bottom (not shown) which form a complete box bounded by members 24,25,20 and 22.

At the front portion the top surface of the table is made from a relatively thin polished granite tablet 30 supported between members 25,26, 20 and 22 on a multiplicity of tubes 28.

The base 2 is made from sheet metal fabricated into a box structure. It consists essentially of three structural flat Aluminium sheets 32,34 and 46 which form the main structural elements of the box. The two sheets 32,34 forming the side walls terminate in pillars 36,38 at their front ends, and in right angle corners 40,42 at their rear ends. Each sheet is located on the table by means of a vee-notch 54,56 and 58 respectively engaging a respective half-round locator 48,50,52 to provide a kinematic location of the base on the table. The vee notches 54,56,58 constitute the support means on the base, and the half-round locators 48,50,52 constitute the second support means. The kinematic location formed thereby prevents the transmission of any distorting forces from the table to the metrology frame.

The sheets are rectangular and are screwed together at their bottom/rear corners. The box is closed by a nonstructural front sheet 44 secured to the rear faces of the pillars 36,38. The sheet 44 may be screwed to one of the pillars 38 or 39 but is connected to the other pillar 36 by sliding spring clips 41. This allows relative movement between the pillars without strain when the metrology frame is connected to the top of the base.

The main rigidity for the base is provided when the metrology frame 3 is attached to the top of the base. The metrology frame consists of a pair of fabricated beams 4 and 5 which extend the full length of the table 1. The beams are joined at their rear ends by an end wall 60, and at a point intermediate between their ends, and corresponding with the position of the pillars 36 and 38, by a further wall 62. Both of the walls 60,62 are hollow Aluminium extrusions. Thus the beams 4,5, end walls 60,62 and top and bottom Aluminium sheets (not shown) form a box structure which has high torsional rigidity. Angle brackets 64, one on each beam 4,5, are connected to the box structure and are dimensioned to fit inside the top of the base and to be connected thereto by screws at positions 70,71,72 and 73. In addition the height of the Aluminium sheet 46 is arranged to be such that it may be screwed to the rear wall 60 of the base at positions 74 and 75. Thus there are six points at which the base and the metrology frame are joined and these six joints ensure that the base is rigidly connected to the metrology frame. Alternatively the base could be rigidly connected to the table and the metrology frame supported on the base by the support means.

The beams 4,5 carry the tracks 6 and 7 which are formed as air bearing surfaces for carrying the bridge 10 (FIG. 1).

Thus it can be seen that the whole structure of the machine is a relatively lightweight fabrication but at the same time has sufficient rigidity to support the moving carriage without distortion. Also, because of the kinematic support of the base on the table, distortions of the metrology frame produced by heavy workpieces on the table are avoided.

A significant advantage of the construction of the base is that it is easy to assemble and disassemble and can be flat packed for transportation. Different heights of base can be provided to enable a range of machines to be offered with different working heights using the same table and metrology frame. Another advantage is that the base can be used with any existing table by simply attaching three half-round locators 48,50,52 to the table at appropriate positions.

It is to be understood that in the complete machine the table is positioned at a convenient working height on top of a stand on the ground. The stand however, is outside the metrology loop and needs only to be sufficiently rigid to support the table, the workpiece and the remainder of the machine, and to react the acceleration forces of the moving parts during operation of the machine.

Also a clamp (not shown) may be provided at the rear wall 46 of the base to clamp the base 2 to the table 1 in the region of the kinematic locator 58,52 to ensure that at no time will the base become separated from the table.

Figure 3:
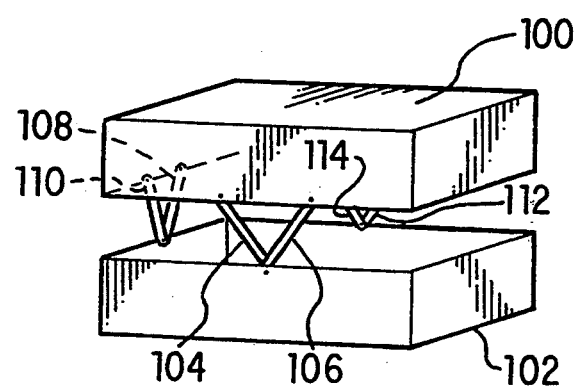
FIG. 3 Is a diagrammatic view of an alternative form of support means of the present invention.

Referring now to FIG. 3 there is shown diagrammatically an alternative form of mounting between two bodies which would be as effective in preventing the transmission of distortions from the table to the metrology frame as the kinematic support shown in FIG. 2.

Two bodies 100,102 are shown and which are interconnected by three pairs of pivoting links 104,106;108,110; and 112,114. The links could be replaced by thin triangular plates.

I claim:

1. A measuring machine comprising:
  a table for supporting workpieces,
  a metrology frame for supporting a measuring device for movement relative to the table, a base disposed between the table and the metrology frame for supporting the metrology frame on the table in spaced-apart relationship therewith, and support means for rigidly connecting the base to one of the table and the metrology frame, for kinematically interconnecting the base and the other one of the table and the metrology frame, and for preventing distortions of the table from being transmitted to the metrology frame.

2. A measuring machine as claimed in claim 1 and in which the support means comprises first support means provided on the base, and second support means provided on the other one of the table and the metrology frame, the second support means being engageable with the first support means.

3. A measuring machine as claimed in claim 2 and in which the first and second support means together constitute a kinematic support.

4. A measuring machine as claimed in claim 1 and in which the metrology frame, the table and the base are relatively lightweight structures.

5. A measuring machine as claimed in claim 4 and in which the metrology frame is fabricated from sheet metal.

6. A measuring machine as claimed in claim 4 and in which the base is fabricated from sheet metal.

7. A measuring machine as claimed in claim 1 and in which the base is rigidly connected to the metrology frame and the support means interconnects the base and the table.

8. A measuring machine as claimed in claim 6 and in which the first support means comprises vee-notches formed in the sheet metal of the base and the second support means comprises half-cylindrical surfaces positioned to engage the vee-notches.

9. A measuring machine comprising a table for supporting workpieces, a metrology frame for supporting a measuring device for movement relative to the table, a base disposed between the table and the metrology frame for supporting the metrology frame on the table in spaced-apart relationship therewith, a support including a rigid connection for connecting the base to one of the table and the metrology frame and a kinematic connection for interconnecting the base and the other of the table and the metrology frame, said kinematic connection preventing distortions of the table from being transmitted to the metrology frame.

* * * * *